United States Patent [19]

Forster et al.

[11] Patent Number: 4,881,433
[45] Date of Patent: Nov. 21, 1989

[54] REMOTE MANIPULABLE DEVICE FOR ESTABLISHING A TRANSPORT CONNECTION WITH A REMOTE MANIPULABLE TOOL

[75] Inventors: Jürgen Forster, Minden; Manfred Bramer, Waldmohr, both of Fed. Rep. of Germany

[73] Assignee: Duetsche Gesellschaft fur Wiederaufarbeitung von Kernbrenstoffen mbH, Hanover, Fed. Rep. of Germany

[21] Appl. No.: 77,285

[22] Filed: Jul. 24, 1987

[30] Foreign Application Priority Data

Aug. 7, 1986 [DE] Fed. Rep. of Germany ....... 3626740

[51] Int. Cl.⁴ .............................................. B25B 21/00
[52] U.S. Cl. ........................................... 81/55; 81/52
[58] Field of Search .................... 81/52, 54, 55, 57.24, 81/57.4

[56] References Cited

U.S. PATENT DOCUMENTS 3,240,511 1/1966 Bishop et al. .
3,489,436 1/1970 Ahlstone .
4,511,295 4/1985 Razdobreev ................. 81/57.4 X

FOREIGN PATENT DOCUMENTS

166587 1/1986 European Pat. Off. ............... 81/55
51679 6/1910 Switzerland .................... 81/57.4 X
1149750 3/1967 United Kingdom .
2038973A 12/1979 United Kingdom .
2171040A 2/1985 United Kingdom .

Primary Examiner—James G. Smith
Attorney, Agent, or Firm—Helfgott & Karas

[57] ABSTRACT

A movable and remotely actuable device is adapted for entering into a transport connection for transport thereof and entering into a direct mechanical actuating engagement for remote actuation thereof with a remotely manipulable tool. First and second retaining elements are employed for entering into the transport connection with the tool. The second element is movably mounted on the device and is configured for direct mechanical engagement with the tool. The second element is adapted for motion to and fro on the device upon actuation by the tool and has first and second extreme positions of its trajectory. The second element, when in its first position, confines the tool between the first and second elements and, when in its second position, enables the tool to be moved into and out of the engagement.

14 Claims, 11 Drawing Sheets

REMOTE MANIPULABLE DEVICE FOR ESTABLISHING A TRANSPORT CONNECTION WITH A REMOTE MANIPULABLE TOOL

The invention relates to a remote manipulable movable device.

BACKGROUND OF THE INVENTION

Such devices are suitable for operation in inaccessible places, for example a hot cell of a nucleaar industry installation. The movable device may, for example, be one part of a two-part plug connection or a covering element for dust-and/or fluid-tight covering of other parts located in the inaccessible place, for example for covering a half-coupling in uncoupled condition. The movable device, however, may alternatively be any other movable part.

A device of this generic kind is described in German Letters of Disclosure 3,334,580. Here the movable, remote-manipulable device is a screw for establishing and/or releasing a flange connection in a radioactively contaminated cell of a reclamation system. The tool here used is a drive wrench means which, to actuate the screw, i.e. to tighten or free it, enters into a direct mechanical engagement with the screw head, but is equipped to set up a magnetic field in order to establish a transport connection. By means of a crane hook engaging ana eye adapted to it in the drive wrench means, the screw may then be transported. As a general rule, the magnetic force suffices for an accident-safe transport connection. In extreme situations, for example upon loss of the magnetic field owing to a power failure or inadvertent collision of the screw with some other object during transport, the transport connection may be released.

It is known also that the retaining element used to establish a transport connection with a remote manipulable toll may be simple aan eye, and that the tool may be simply an open crane hook (see e.g. J. Mischke, Chem.-Ing.-Tech. 58(1986 No. 2), 120–124). Such a combination of retaining element and tool is especially simple. However, in case of an inadvertent movement or a collision of the device with some other part in the inaccessible place, the crane hook may slip out of the eye. The device may then be lost, and in falling it may sometimes damage or even destroy still other equipment. This in turn may shut down the entire inaccessible system, for example the hot cell or a chemical plant. Add to this that a tool in the form of a crane hook is essentially usuable for transport purposes only.

SUMMARY OF THE INVENTION

The invention is addressed to the problem of enhancing safety in the manipulation of a device of the kind first mentioned.

According to the invention, this object is accomplished in that the movable device is fitted with second retaining element movably mounted in or on the device and configured for direct mechanical engagement with the tool, in such manner that it can be moved to and fro in or on the device by actuation of the tool and holds the tool imprisoned between itself and the first retaining element in one extreme segment of its trajectory.

but permits the tool to be brought into or out of engagement in another extreme segment of its trajactory.

According to the invention, then, the tool, or a segment thereof, is held fixed sandwichwise, by fit or pressure closure, between two holding elements connected to the movable device. For this purpose, the movable holding element and the portion of the tool riding upon it are moved by appropriate actuation of the tool relative to the first holding element. To provide clearance for bringing mutually adapted segments of the tool and movable holding element into and out of engagement with each other, the movable holding element may also be moved away from the first holding element by means of the tool.

Besides the secure transport connection between the movable device and the tool, the approach according to the invention has the further advantage that the function of the tool is not limited to the purpose of transport, like a crane hook, say, but may assume other functions as well. If the tool employedd is a socket screwdriver or wrench, for example, with a revolving bead at its foot end, the tool may additionally serve for screwing threaded bolts in or out. It should here be noted that a drive wrench has proved advanatageous for remote handling in inaccessible places, for example a hot cell. In other words, the invention enables a tool, for example a drive wrench, employed for remote handling of connecting elements, to perform an additional function, namely the function of a transport tool. A special transport tool, for example a crane hook, may then be dispensed with. In this way, the number of remote handling tools required and hence the number of tool changes required are reduced. This in turn leads to a simplification of remote handling, thereby rendering it more secure.

German Letters of Disclosure 3,151,532 and 3,421,452 disclose automatic tool changers having fixed and movable holding elements as well as engaging elements and actuating means that permit engagment and disengagement with the tool and hence a tool change. The tools and tool holders described in those sources correspond to the movable remot handling means according to the invention. The adapters or coupling parts there described correspond to the tool according to the invention. If only for that reason, the known devices are hardly comparable with the subject matter of the invention. Add to this that in the invention the transport connection between tool and device is brought about by active movement of both parts, whereas in the known devices only the one part, namely the adapter or coupling, actively grasps and secures the other part, namely the tool.

According to a preferred embodiment of the invention, the second holding element takes the form of a threaded screw. Here the first holding element has a first segment embracing the head end of the screw and the foot end, in engagement therewith, of the tool, substantially semilaterally and at a distance; also, a second segment fixed to the distal segment of the first segment and having a shape adapted to the foo end of the tool. This second segment is additionally provided with an opening for a lateral insertion or withdrawal of the tool segment adjacent to the foot end of the tool. This arrangement has the advantage that a conventional fastening element, that is, a threaded screw for example, in addition to its function otherwise, may be utilized also to establish the transport connection.

The invention further embraces a remote manipulable means for establishing or releasing a connection between two mutually complementary subassemblies by relative displacement thereof towards and away from each other, said means comprising the movable device described above and a stationary device. Each of the two devices contains one of the subassemblies. Besides, the movable device is able to approach or enter a preassigned extreme position on or in the stationary device. In this case the one subassembly is displaceably lodged in the one device. The second holding element of the movable device is additionally configured as an actuating member for displacing the displaceable subassembly to and fro —and hence mutually connecting or releasing the two subassemblies —in such manner that the releasable transport connection between the movable device and the remote-manipulated tool is established automatically in the mutually released setting of the two subassemblies.

Such remote manipulable means serve primarily for releasable coupling of lines for gaseous or liquid media, electrical energy, signals for measurement, control and/or regulation. Here the stationary device with the subassembly accommodated therein serves so to speak as pick-up point for the above-mentioned media, electrical energy and/or signals. The parts of the two subassemblies are here the terminations, configured complementarily for mutual interconnection, of the above mentioned lines. Alternatively, each subassembly may for example contain a single component only. The components arranged in the movable device aare oridinarily connected on the output side by way of flexible lines to one or more auxiliaries, required for example in making repairs in inaccessible places, for example in a hot cell. Such auxiliaries, likewise remote manipulated, regularly require the supply of gaseous and/or liquid media, electrical energy, and measurement, control and/or regulation signals, for their operation. Typical auxiliaries for repairs in a hot cell, for example the repair of a leaking tube, are tongs, saws, seam preparation tools, welding tools, gas delivery means and TV cameras.

In a hot cell, the stationary device is preferably fixed to a side wall or framework module, while the movaable device is at all times connectedd by the flexible lines to one of the aforesaid auxiliaries. The auxiliary or repair means together with the movable devices constantly connected thereto are likewise kept in the inaccessible location, in this example, that is, the hot cell. At need, the repair means are withdrawn by remote manipulation from the place where they are kept and fixedly emplaced in a suitable position at the place of repair. The movable device is likewise withdrawn by remote manipulation from its place of storage for repair work and —with the aid of any centering and guiding elements —positioned in or in relation to the stationary device for the purpose of coupling together the two subassemblies, here the groups of line terminations, in the manner of a two-part plug-in connection. After the repair work has been done, the two subassemblies are uncoupled and the movable device with auxiliary and repair equipment is stowed, in the reverse order.

When the construction of a hot cell is modular, the stationary device may alternatively be rigidly connected to the module, for example directly attached to its framework, in the form of a blind receptacle. The latter in this case serves for secure retention of plugs, flexibly connected to the module. This applies especially when, in a case of transport of the module as a whole, the plugs are to be secured against "dangling".

The one subassembly may alternatively be merely a protective cover or cap for the component or components of the complementary subassembly, for example the group of line terminations, at the "pick-up" point, i.e. the stationary device.

The aforedescribed embodiment the advantage that the means may be actuated, i.e. "coupled in," "coupled out" and the movable part transported by remote manipulation, entirely by means of a single tool, for example a drive wrench. For it is assured that the remote-manipulated tool, in released or uncoupled condition of the two subassemblies, can enter into a secure transport connection with the movable device, without requiring a tool change to be executed for that purpose. Through the option of not having to perform a tool change in the remote manipulation of the means as described, a large measure of security is afforded. Thus, for example it is assured that the movable device will not change position owing to a tool change that would otherwise be needed, or perhaps be dropped and thereby damage other parts and/or become irretrievable.

Preferably, the means further comprise locking elements for automatic mutual interlocking of the two devices in the extreme position of the movable device on or in the stationary device, the locking elements being so coupled with the position of the displaceable subassembly that the interlocking is performed before or upon attainment of the interconnected setting of the two subassemblies. This ensures that the movable device will be securely held to an object, here the stationary device, even when its transport connection to the remote-manipulated tool has been released again after attainment of the connection setting of the two subassemblies. The movable device and the subassembly integrated with it can thus be securely conneced to or released from the stationary device or subassembly even when the stationary device is disposed vertically above the movable device, so-called "overhead" operation.

The remote manipulation of the preferred means is further simplified in that preferably the locking elements are designed also for mutual automatic unlocking of the two devices upon commencement of release of a mutual connection of the two subassemblies. This move ensures that the means will always be completely operable by a single tool, without tool change, even when complemented with the aforesaid locking elelment.

The remote manipulation of the means is further simplified in that the two devices are preferably fitted with the aforesaid centering/guiding elements and the displaceable subassembly is accommodated in the movable device, although in principle it might alternatively be accommodated in the stationary device.

Example of applications of the invention will now be described with reference to the accompanying drawing. The description to follow will also disclose additional preferred embodiments of the invention and the advantages associated therewith.

BRIEF DESCRIPTION OF THE DRAWINGS

In the drawing,

FIGS. 4 a and b are partial views of the above embodiment, illustrating certain functions;

FIGS. 5 a, b and c are additional partial views illustrating additional functions of the said embodiment;

FIG. 8 is a pictorial representation of another embodiment of a part of the system;

FIGS. 15 a and b show partial views of FIG. 13 to illustrate additional functions of the system.

All functionally corresponding parts in the drawing are provided with like reference numerals. Hence they will not be described separately for each figure. Instead, from this point on, express reference will be made to that figure for which such parts have been specifically described.

DETAILED DESCRIPTION OF THE PREFERRED EMBODIMENTS

Figure 1:
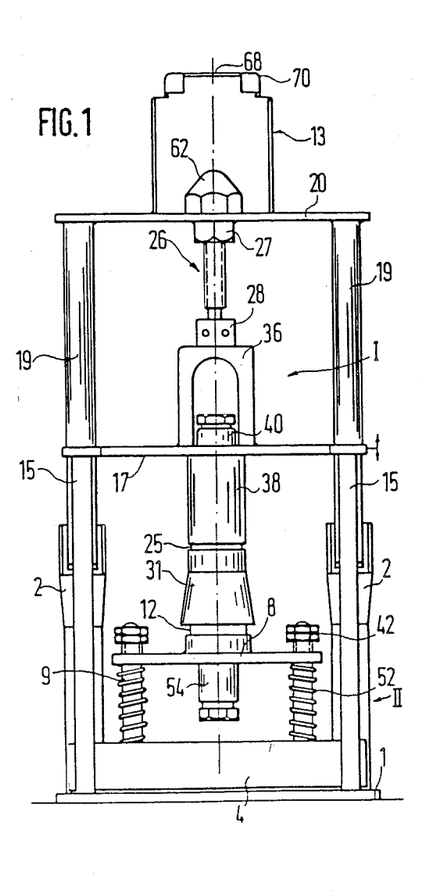
FIG. 1 shows a front view of a first embodiment.
Figures 2, 3:
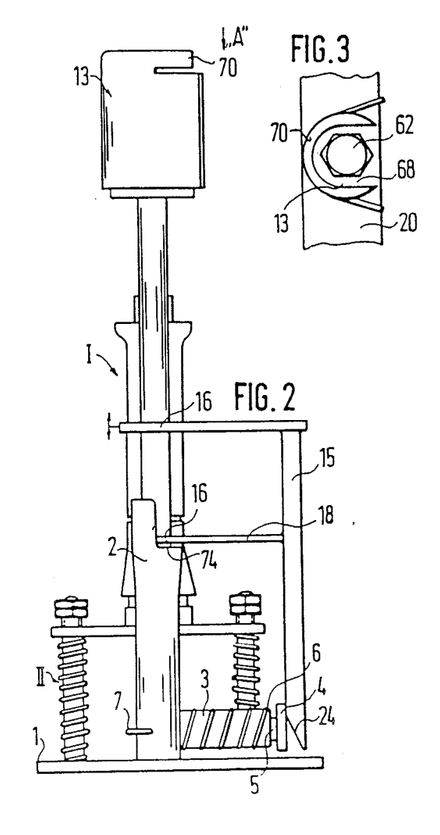
FIG. 2 shows a side view of the embodiment of FIG. 1.
FIG. 3 shows a view in the direction "A" in FIG. 2.

FIGS. 1, 2 and 3 show a first embodiment, by way of example, of a means for connecting or releasing an electrical plug coupling by means of a remote-manipulable drive wrench. The embodiment is shown in coupled condition of the electric plug-in connection, the drive wrench having first been brought out of engagement with the system.

According to the figures, this embodiment comprises a movable device I and a stationary device II. The parts of the stationary device III are mounted on a baseplate 1, which in turn is fixed to a stationary wall (not shown) of an inaccessible area intended for remote manipulation, for example a hot cell of a nuclear installation. Two guide tubes 2 connected to the baseplate 1 extend at a distance from and parallel to each other away from the baseplate 1 at right angles. Their open end segments are enlarged towards the distal end, at first conically and then by a step 74 into a half-cylinder or trough shape. This conformation of the terminal segments of the guide tubes 2 facilitates insertion of two centering rods 19 arranged on the movable device I into the guide tubes 2.

Four compression springs 52 hold a first connecting plate 8 at a sprung distance from the baseplate 1. Four pins passed through the springs 52 and connected to the baseplate 1 center the first connecting plate 8. Nuts and locknuts 42 on the free ends of the pins secure the first connecting plate 8, and may at the same time serve to prestress the connecting plate 8 against the springs 52. This mode of suspension of the first connecting plate 8 has the advantage that a part disposed upoon it, in this case electric socket connection 12, is always in contact with preassigned spring pressure against a complementary part, in this case pressure against a complementary part, in this case an electric plug connection 25, in the movable device I. If for example a sealing ring or lip is arranged between the electric socket/ plug connection 8, 25, this will serve to seal the electric coupling from dust and/or water. Besides, the spring mounting of the first connecting plate 8 will conveniently compensate for tolerances.

The supply cable for the electric socket connection 12 passes out of the system by way of a cable connection 54. The connection 54 protrudes into the space between the baseplate 1 and the first connecting plate 8, and leads through the latter to the socket connection 12. The plug connection 25 provided in the movable device I has a similar cable connection 40. This leads through a second connecting plate 17, to which the plug connection 25 is secured by an intermediate suspension 38.

The second connecting plate 17 is (in top view) more or less U-shaped, and displaceable to and fro on the centering rods 19 by way of slide bearings 16. The slide bearings 16 of the second connecting plate 17 are disposed in its two corner areas between the two mutually parallel legs and the cross-bar of the U-shape. Two more or less rod-like compression members 15 rigidly connected to the free ends of the legs of the second connecting plate 17 project, in the assembled position of the plug connection 25 and the socket connection as shown, into the region of the baseplate 1. They are additionally supported by transverse braces 18, likewise having slide bearings 16 at their free ends.

The two free ends of the two compression members 15 when displaced in the direction of the baseplate 1 enter into engagement, in the extreme segment of their motion, with a plate-like shim 4. The shim 4 is disposed transverse to the two pressure members 15 and bridges the entire interval between them. The shim 4 is displaceably mounted in two bearing sleeves 3 by way of two locking pins 5 projecting perpendicularly from it. The sleeves 3 are attachedd to the guide tubes 2 in the foot region thereof and extended parllel to and at a distance from the baseplate 1. In the setting of the system as shown in FIGS. 1 and 2, the locking pins 5 extend through the wall of the guide tube 2 into a hole 21 (FIG. 4) in the centering rod 19. A compression spring 6 encircles each sleeve 3, its two ends pressed into contact with the guide tube 2 and the surface of the shim 4 facing the tube 2. The resulting prestress of the shim 4 is maintained by two limit stirrups 7 connected thereto, the free end of each stirrup 7 encircling a guide tube 2. The prestress is so chosen that the shim 4 will draw the locking pins 5 out of the hole 21 in the centering rod 19 when the compression members 15 are out of engagement with the shim 4. This is the case when the second connecting plate 17 is moved away from the first connecting plate 8. Beveled end surfaces 24 on the compression members 15 ensure a secure and pressureless engagement and disengagement of pressure members 15 and shim 4.

The bearing sleeves 3 attached to the guide tubes 2, the shim 4, the locking pins 5, the compression springs 6, the compression members 15 and the holes 21 in the centering rods 19 thus serve as locking elements for automatic interlocking and unlocking the movable device I to and from the stationary device II. The dimensions of the elements of the movable device I, for example the lengthwise dimension of the compression member 15, and/or the elements of the stationary device II, for example the distance between bearing sleeve 3 and baseplate 1 are so chosen that the two devices I and II are already interlocked with each other before the electric plug connection 25 has made contact with the electric socket connection 12. This ensures that the axial pressure engendered by thrusting the two electric connections 12 and 25 one into the other will not lead to an axial displacement of the centering rods 19 upward in the guide tubes 2. At the same time, the two electric connections 12 and 25 may be pressed together with considerable pressure, with the resulting sealing effect aforementioned. Instead of or in addition to the said sealing lip between the two electric connections 12 and 25, the plug connection 25 may alternatively be fitted in addition with a sealing bell 31 closing tightly over the socket connection 12.

The second connecting plate 17 and the elements rigidly connected to it, for example the compression members 15 and the plug connection 25, are thrust to and fro inside the movable device I along the centering rods 19 by an actuating member 26, likewise located in the movable device I. The actuating member 26 is in the form of a threaded spindle or screw. Its thread rotates in a threaded nut 27 fixed in the center of a yoke 20 bridging the ends of the centering rods 19 away from the baseplate 1. The head end 62 of the actuating member 26 protrudes from the movable device I and takes the form of a hexagon screw head. The foot end of the actuating member 26 rotates freely in a bearing 28 fixed in turn to the cross bar of a more or less U-shaped connecting piece 36. The connecting piece 36 bridges the cable connection 40, and the free ends of its legs are fixed to the second connecting plate 17.

Rotation to and fro of the head end 62 of the actuating member 26 leads to a sliding to and fro of the second connecting plate 17 and the parts coupled with it in motion towards or away from the first connecting plate 8. These parts of course include the head end 62 of the actuating member 26.

A head piece 13 encircles the head end 62 in the manner of a hollow half-cylinder and roofs it over at a distance with a cap-like closure 70. The foot region of the head piece 13 is fixed to the outer surface of the yoke 20. The distance between the cap-like closure 70 and the outer surface of the yoke 20 is so chosen that the socket (not shown) of a drive wrench used to rotate the hexagonal head end 62 will make close contact under pressure with the inner surface of the caplike closure 70 when the electric plug connection 25 is released from the socket connection 12 and it remains only to withdraw the centering rods 19 from the guide tubes 2. A U-shaped recess 68 provided in the closure 70 permits a convenient insertion of the wrench into the head piece 13 to bring its socket into engagement with the hexagonal head end 62.

Upon extraction of the plug connection 25 from the socket connection 12 by rotation of the hexagonal head end 62 with the socket of the drive wrench, a releasable transport connection is thus automatically established between the wrench and the head piece 13 - and hence with the movable device I as a whole. Thus the movable device I can be conveniently and safely transported away with no tool change after release of the two electric connections 12 and 25.

Figures 4A, 4B, 8A, 8B:
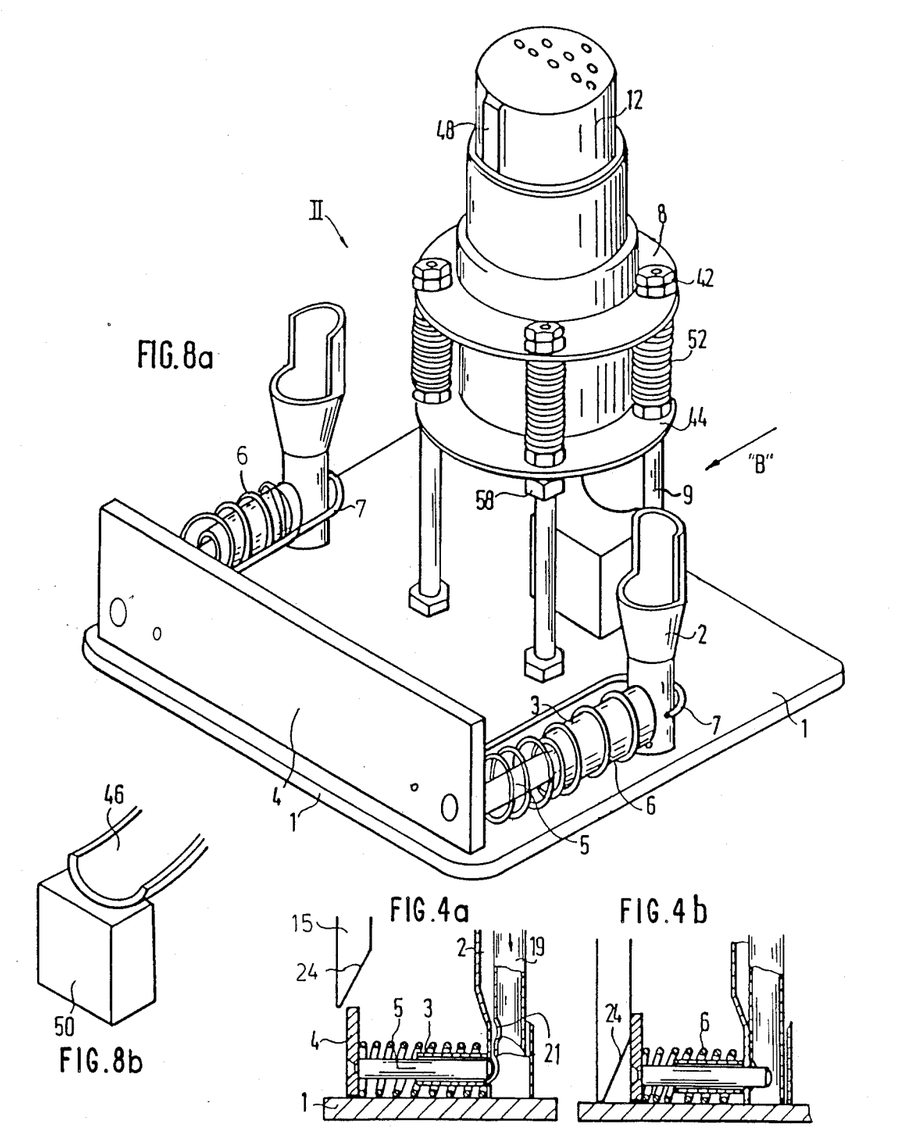

In the aforementioned FIG. 4, a partial view again illustrates the locking operation. FIG. 4a shows the simultaneous downward motion of the centering rods 19 in the guide tubes 2 and that of the compression pieces 15 towards the baseplate 1. The beveled end surfaces 24 of the pressure pieces 15 are offset to the rear in the direction of motion relative to the holes 21 in the centering rods 19. This offset is so chosen that the interlocking of the movable device I with the stationary device II takes place simultaneously with contact of the centering rods 19 with the bottom of the guide tubes 2.

Upon further sliding of the compression members 15 by means of the actuating member 26, the locking pins 5 are thrust farther into the holes 21 in the centering rods 19, and at the same time the plug 25 is thrust into the socket 12. In the extreme position, the pressure members 15 strike the baseplate 1, thus signaling that the connecting operation has been completed. In this position also, the oblique end surfaces 24 are no longer in contact with the shim 4, but rather surfaces of the compression members 15 that are parallel to the shim 4.

FIG. 5 illustrates the extraction of the electric plug connection 25 from the socket connection 12, and at the same time the establishment of the transport connection between the wrench III and the movable device I.

Figure 5A:
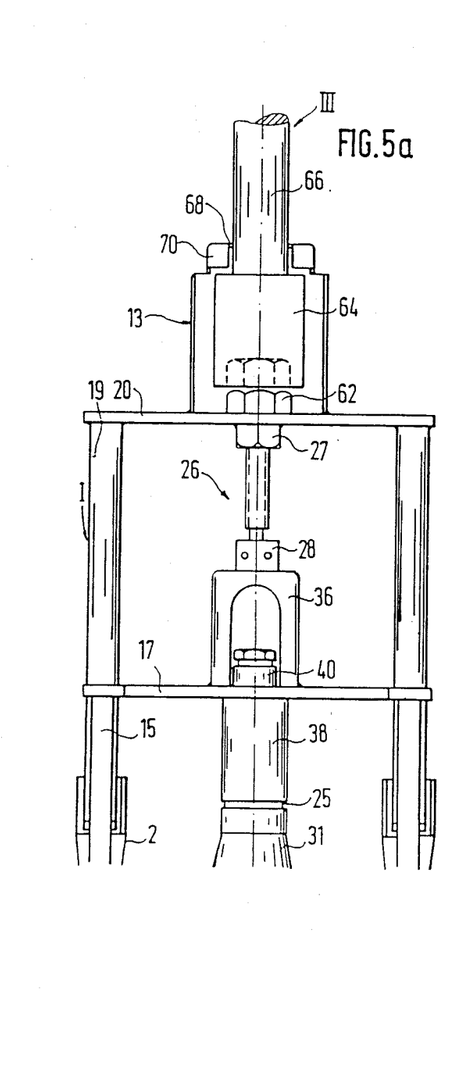

FIG. 5a shows the socket 64 and shank 66 of the wrench III run into the head piece 13. The socket is not yet in mechanical engagement with the head end 62 of the actuating member 26. In this phase, the electric connections 25 and 12 are still fixedly connected together.

Figure 5B:
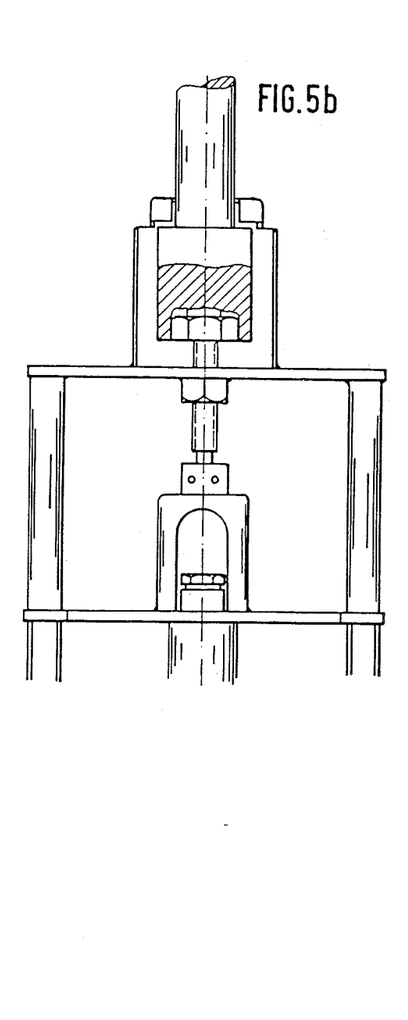

FIG. 5b shows the wrench socket 64 placed on the hexagonal head end 62 and thus brought into engagement, in releasing the union of the elecric connections. The actuating member 26 has already somewhat lifted the second connecting plate 17 and hence the plug connection 25 as well.

Figure 5C:
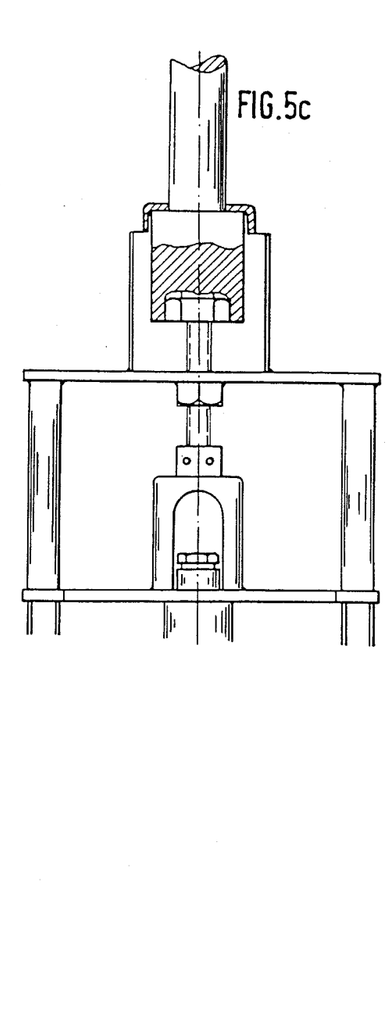

FIG. 5c shows the wrench socket 64 run in on the hexagonal head end 62 into the cap-like covering 70. The socket is now fixed between the cover 70 and the head end 62 of the actuating member 26. The plug 25, released from the socket 12, is securely connected to the wrench and can be conveniently manipulated therewith. The interlock between the movable device I and the stationary device II has likewise been eliminated.

Figure 6:
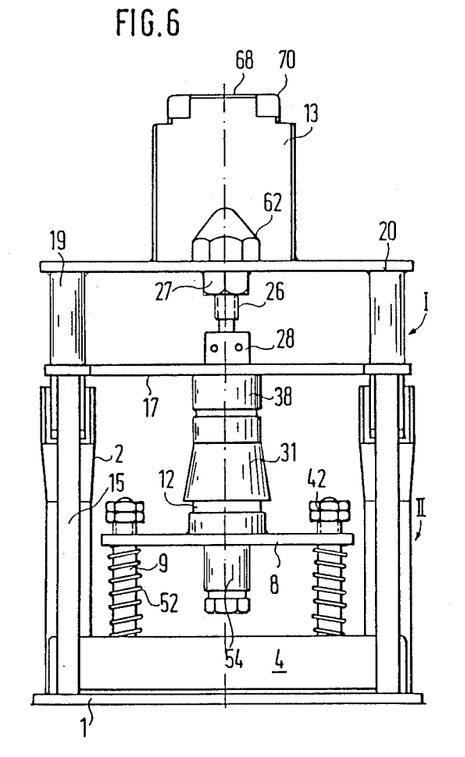
FIGS. 6 and 7 are a front and side view of another embodiment.
Figure 7:
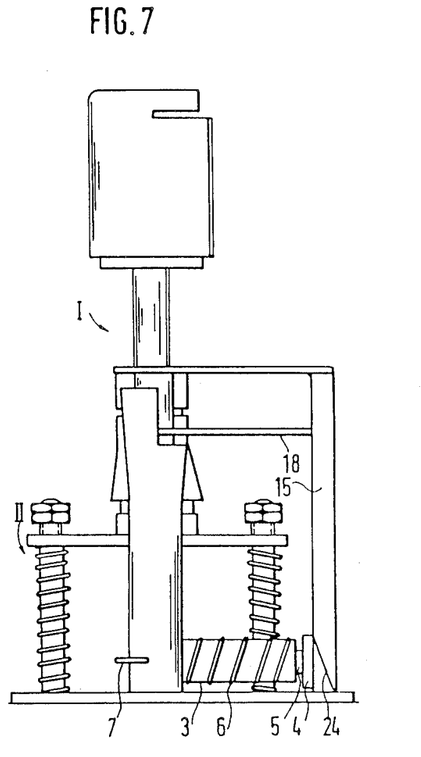

In the embodiment shown in FIGS. 6 and 7, the stationary device II is the same as the device II shown in FIGS. 1 to 4, so that reference may be made to FIGS. 1 to 4 in that regard.

The movable device I, however, differs from the like device I previously described in that it does not contain an electric plug connection but merely a sealing bell 31 with rubber ring to recover the electric socket connection 12 when not in service. Accordingly, the movable device I shown in FIGS. 6 and 7 and serving merely as a covering or protecting means exhibits no such electric cable connection, or connecting piece bridging the same, as in FIG. 1. Instead, the rotary bearing 28 is fixed directly on the second connecting plate 17. In other respects, reference is made to the preceding description of the movable device I with reference to FIGS. 1 to 3.

FIG. 8 again illustrates, pictorially, the stationary device II, but in a different embodiment. The electric connection socket 12 is here intended for a multi-pole, for example 51-pole plug. Owing to the thicker electric connecting cable therefore required for the socket 12, the first connecting plate 8 disposed at a correspondingly greater distance from the baseplate 1. This provides room for a cable guide 46, fixed in turn to a block 50. The block 50 and cable guide 46 are again illustrated in detail "B".

The compression springs 52 rest, in this embodiment, on an intermediate piece 44, in turn suspended at a sufficient distance from the baseplate 1 by means of threaded nuts 58.

In this embodiment also, a nose 48 may be noted on the connection socket 12, guiding the electric plug connection precisely by way of a groove provided therein and at the same time securing the desired alignment of the plug pins with the connection socket 12.

The remaining parts of the stationary device II have already been fully described with reference to the preceding figures.

FIGS. 9 to 15 illustrate another embodiment by way of example, for the connection of three lines, namely a multi-pole electric line and two other lines for gaseous or liquid media.

Figure 9:
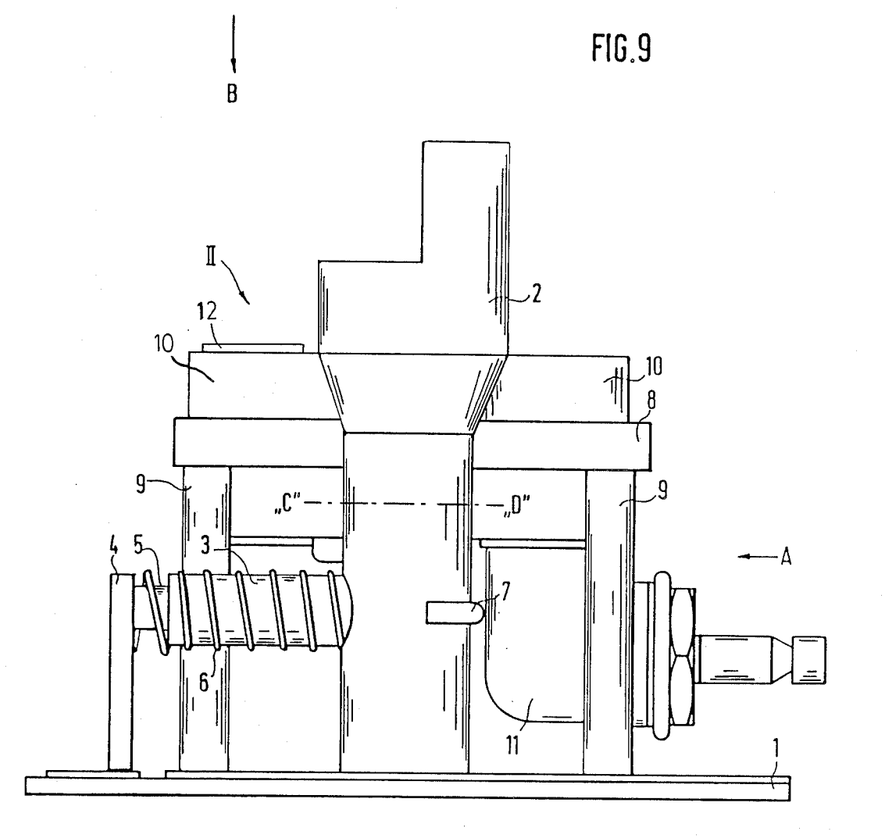
FIG. 9 is a side view of part of another embodiment.
Figure 10:
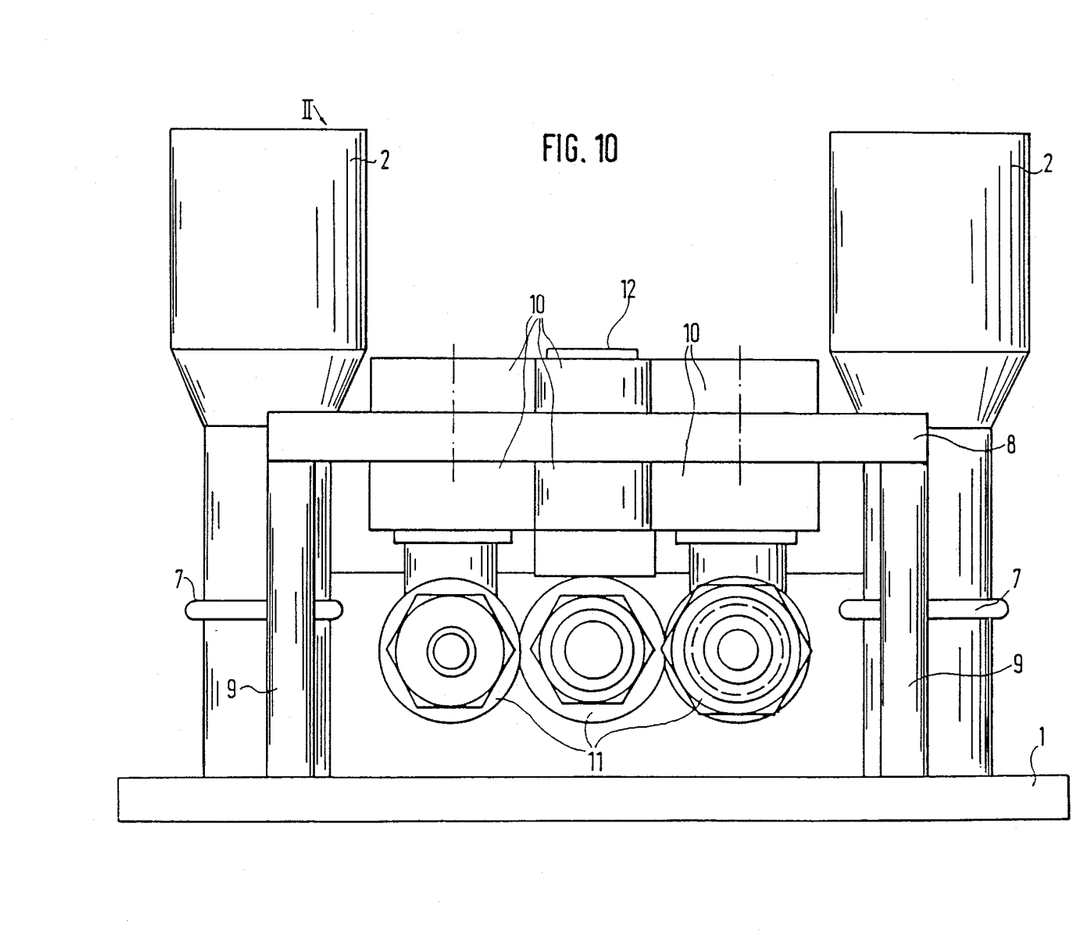
FIG. 10 is a view "A" of the part shown in FIG. 9.

Another difference from the preceding embodiments consists in that in this embodiment, the first connecting plate 8 is fixed directly on the pins 9, i.e. with no interposed compression springs (figs. 9 and 10). Furthermore, the second connecting plate 17 is differently placed in the movable device I (FIGS. 12 to 14).

Figure 11:
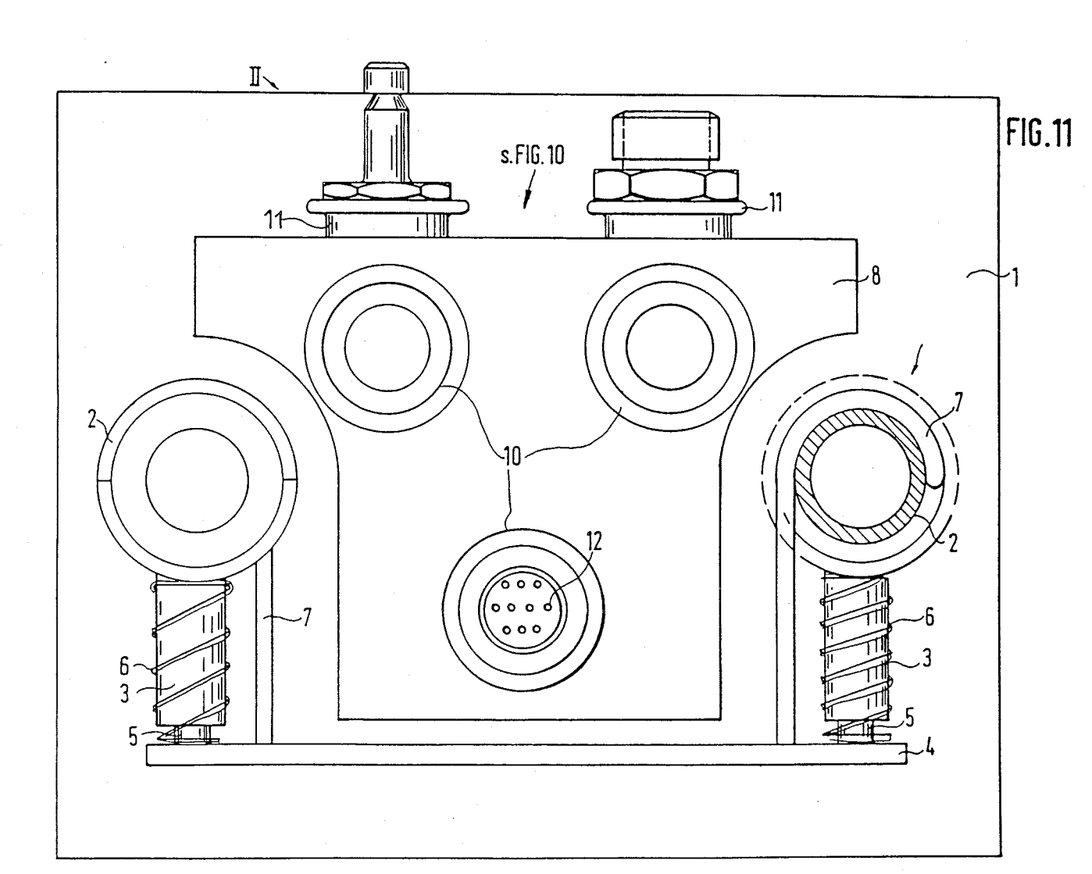
FIG. 11 is a view "B" of section "C"-"D" of the part shown in FIG. 9.

Specifically, FIGS. 9 to 11 show the movable device II in side view (FIG. 9), as viewed at "A" in FIG. 9 (FIG. 10) and as viewed at "B" in section "C"-"D" (FIG. 11) in FIG. 9. With the first connecting plate 8 in this embodiment, a subassembly with three components in integrated, namely three taper bushings 10, connectig in turn to elbows 11. The elbows 11 open into the interval between baseplate 1 and first connecting plate 8. The electric connecting socket 12 previously described is integrated into one of the taper bushings 10.

The other elements of the stationary device II have already been described with reference to the previous embodiments.

Figure 12:
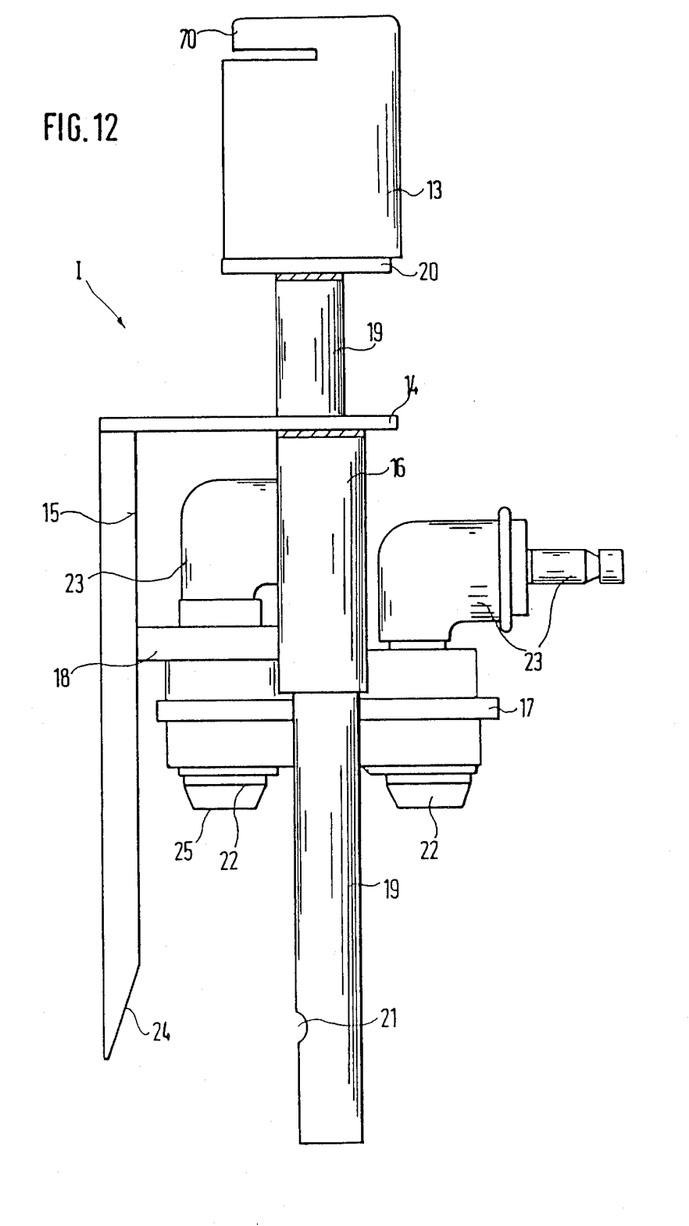
FIG. 12 is a side view of the additional part corresponding to the part shown in FIGS. 9 to 11, in the direction "E" in FIG. 14.
Figure 13:
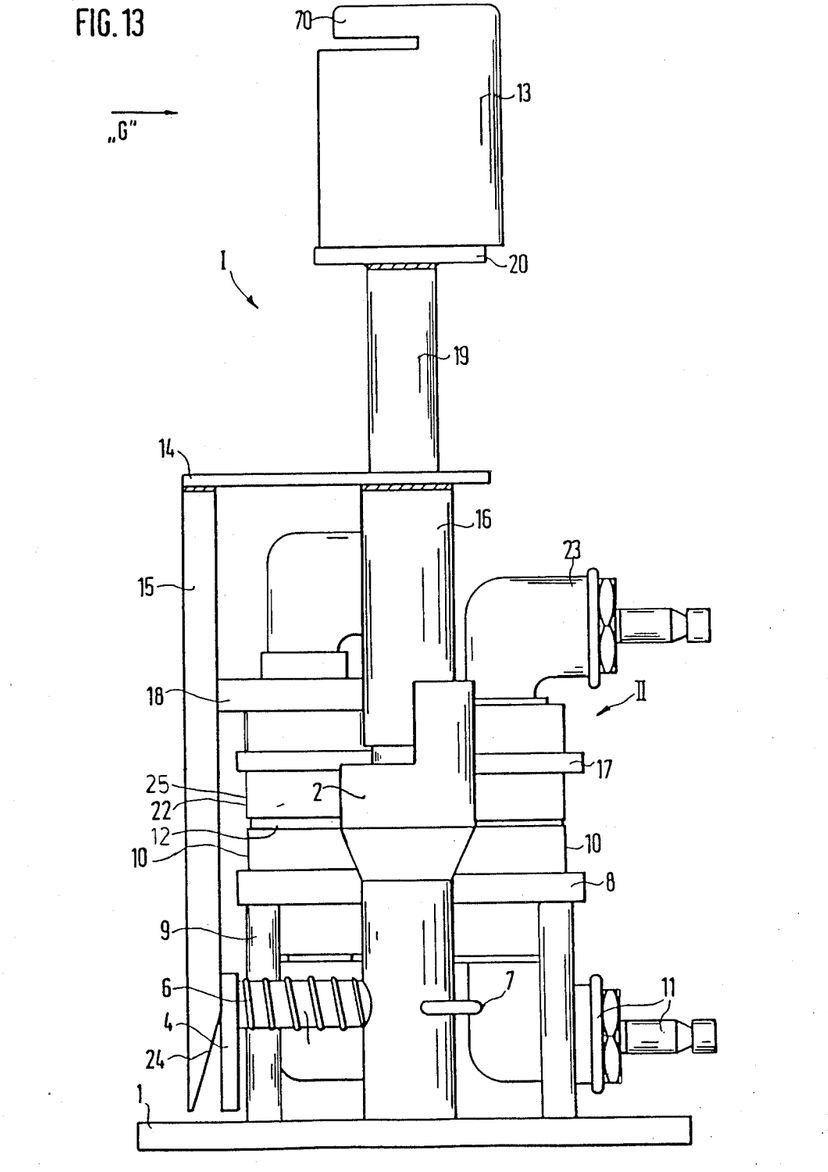
FIG. 13 shows the parts shown in FIGS. 9 and 12 in their connected condition, viewed in the same direction as in FIG. 12.
Figures 14A, 14B:
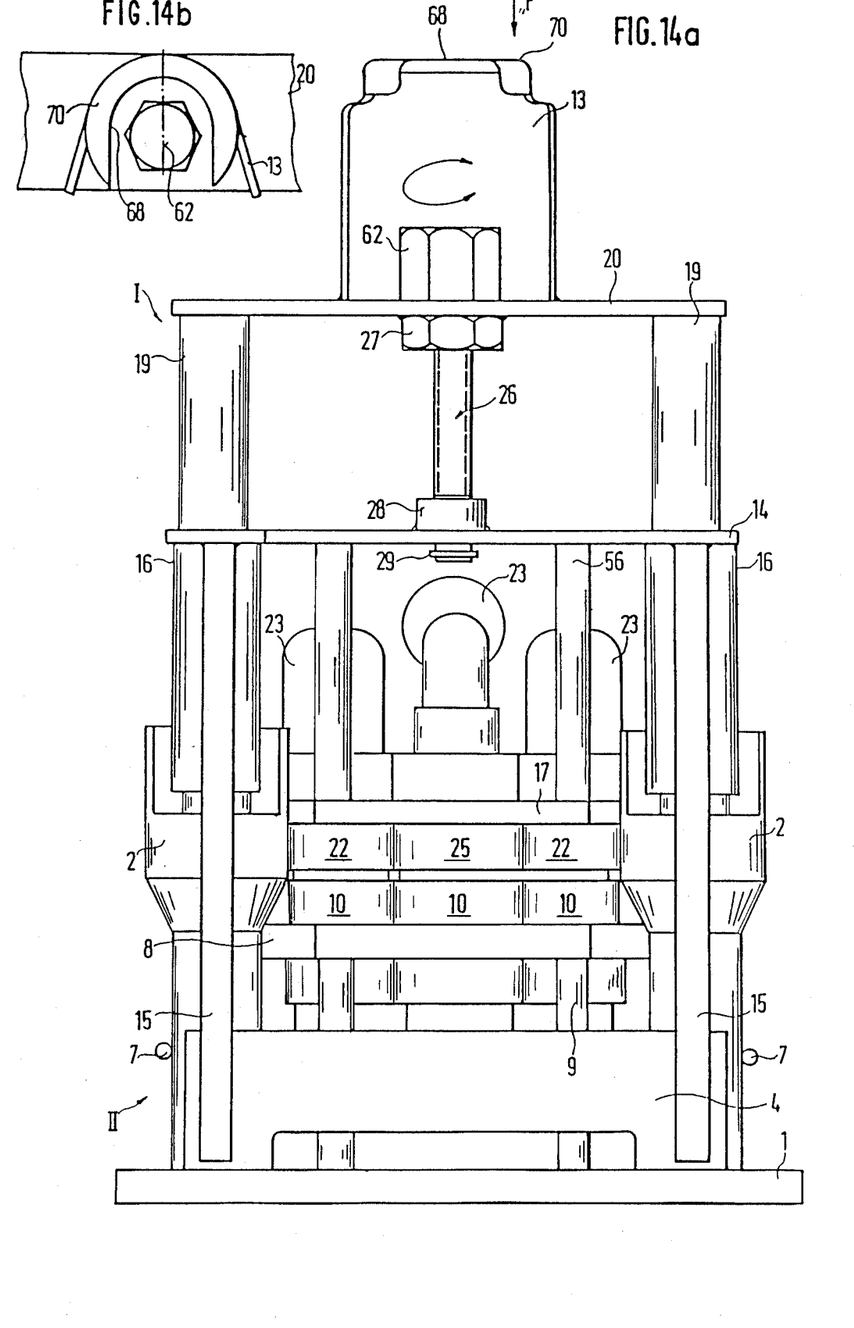
FIG. 14 is a front view of the system shown in FIG. 13.

FIG. 12 illustrates the movable device I as seen at "E" in FIG. 14. The embodiment shown in FIGS. 12, 14 differs essentially from the previous embodiments in that a group of three taper plugs 22 is integrated into the second connecting plate 17. Two of the taper plugs 22 are intended for connection to a liquid or gas line, while the third contains the electric plug connection 25. The taper plugs 22 are connected to elbows 23 arranged in the space between the second connecting plate 17 and a top plate 14 connected to it by bolts 56.

The top plate 14 is disposed —in the direction of view of the yoke 20 —above the second connecting plate 17. The top plate 14 is of essentially the same form as the second connecting plate 17 shown in the previous examples. Here, however, its slide bearings 16 for displacement on the centering rods 19 are tubular. The pressure members 15 are again fixed to the free ends of the two legs of the U-shaped plate 14 and supported by transverse braces 18 against the tubular slide bearings 16. The second connecting plate 17 —contrary to the previous examples —is not mounted directly on the centering rods 19, but only by way of its bolted connection to the top plate 14. Like the first connecting plate 8, on its side surfaces facing the centering rods 19 it has an opening to make room for the taper enlargements of the terminal segments of the guid tubes 2.

Otherwise, the rotary bearing 28 is fixed directly to eh top plate 14. The actuating member 26 protrudes somewhat from the top plate 14 towards the second connecting plate 17, and is there secured from rotating out by means of a safety ring 29.

FIG. 13 shows the devices I and II, represented in mutual engagement in FIG. 14, as seen at "E" in FIG. 14.

The other elements shown in FIGS. 12 to 14 have already been described in essentials with reference to the preceding figures.

FIG. 15 illustrates the uncoupling of the connecting tapers 10, 22 and 12, 25 of the embodiment shwon in FIGS. 9 to 10, and at the same time the automatic unlocking of the movable device I from the stationary device II.

Figure 15A:
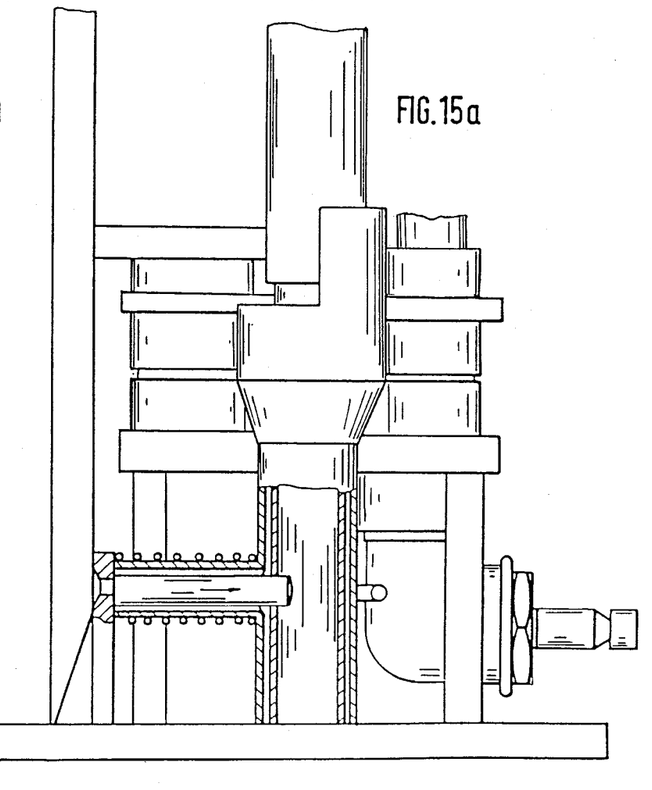
Figure 15B:
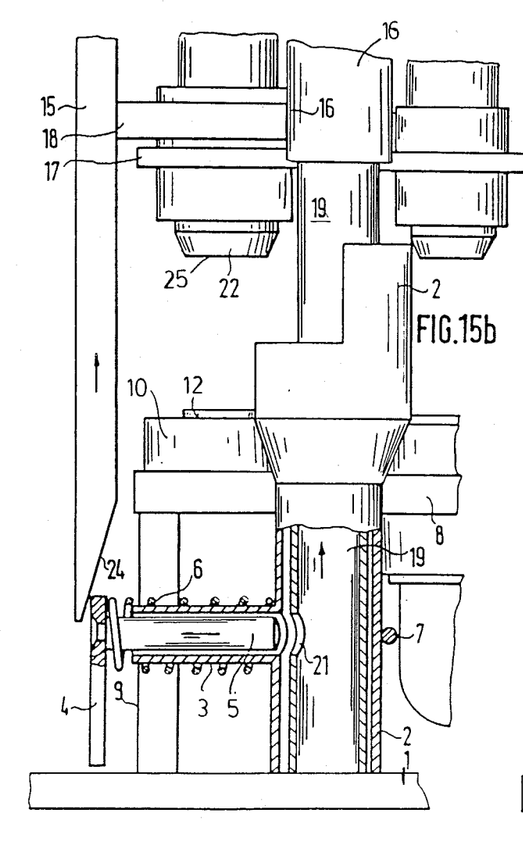

FIG. 15a shows the coupled and locked condition of the aforesaid parts, and FIG. 15b shows their uncoupling and simultaneous unlocking. FIGS. 15a and 15b thus correspond to FIGS. 4a and 4b, the former being illustrative of the coupling and locking, and the latter of the uncoupling and unlocking.

The hexagon 62 is represented with a conical finial in FIGS. 1, 3 and 6, and with no such finial in FIGS. 5 and 14. Is advantage is that it guides the socket 64 onto the hexagon 62, although it presupposes a corresponding depth of the inner recess of the socket 64 and hence a correspondingly long free stroke of the socket 64 in the head piece 13. The comparatively flat hexagon 62 shown in FIG. 5 requires a comparatively lesser depth of recess in the socket 64, and will be in or out of engagement with the socket 64 after a comparatively short stroke correspondingly.

What is claimed is:

1. In a combination of a remote manipulable tool with a movable remotely actuable device, said tool actuating said movable device for establishing and releasing a connection between a first subassembly and a second subassembly, said movable remotely actuable device comprising a first retaining element adapted to establish a transport connection with said tool, a second retaining element connected with one of said first and second subassemblies, said second retaining element being movably mounted in said movable device and being partially configured for a direct mechanical engagement with said tool in such a manner that said second retaining element is reciprocally movable in said movable device upon actuation of said tool between two extreme positions, said first retaining element and said second retaining element being constructed so that said second retaining element holds an actuating portion of said tool fixed between said first retaining element and said second retaining element in one of said two extreme positions but permits said tool to be brought into and out of said engagement in another of said extreme positions so as to release or establish the connection between said first subassembly and said second subassembly.

2. The combination of claim 1, further including a stationary device supporting one of said first and second subassemblies, said movable device being movable relative to said stationary device so as to establish or release the connection between said first and second subassemblies.

3. The combination of claim 2, wherein said tool has a foot with an adjoining portion, said second retaining element being a screw havign a head at one end thereof engageable in said adjoining portion, said first retaining elementn including a first portion surrounding said head of said screw and said adjoining portion when the latter is engaged with said head and at a distance from said head, and a second portion adapted to an end of said foot opposite to said adjoining portion, said second portion having an opening for a lateral insertion and withdrawal of said tool, said second portion covering said first portion.

4. The combination of claim 2, wherein said movable device supports another of said subassemblies and is adapted to be moved to and from said stationary device so that saidd first and second subassemblies become engaged with or disengaged from each other.

5. The combination of claim 4, wherein said another of said subassemblies is displaceably mounted on said movable device and said second retaining element is constructed as an actuating member for a reciprocal displacement of said another subassembly.

6. The combination of claim 5, and further comprising locking means for mutually interlocking said movable device with said stationary device, said locking means including interlocking elements on said movable device and said stationary device and being adapted to couple said movable device with said stationary device such that an interlock occurs at least upon attaining a junction position of said first and second subassemblies.

7. The combination of claim 5, wherein each said device includes centering and guiding elements for guiding one device relative to another when said movable device is moved relative to said stationary device.

8. The combination of claim 7, wherein said second retaining element is a threaded spindle adapted to act on a displaceable one of said subassemblies.

9. The combination of claim 7, wherein said head of said screw is hexagon-shaped and said foot of said tool is formed as a socket of a drive wrench, said first portion of said first retaining element being formed as a hollow half-cylinder and said second portion thereof being formed as a cap adapted to a shape of the wrench socket.

10. The combination of claim 9, wherein said displaceably mounted subassembly is mounted on said centering and guiding elements for a longitudinal displacement therealong.

11. The combination of claim 6, wherein said interlocking elements include a first interlocking element connected to said movable device and a second interlocking element connected to said stationary device.

12. The combination of claim 11, wherein said first interlocking element is a rigid body connected to one of said subassemblies and projecting therefrom towards the stationary device when the devices are engaged.

13. The combination of claim 12, wherein said second interlocking element is a body spring-mounted displaceably on the stationary device.

14. The combination of claim 13, further including an additional locking element on the movable device.

* * * * *